UNITED STATES PATENT OFFICE.

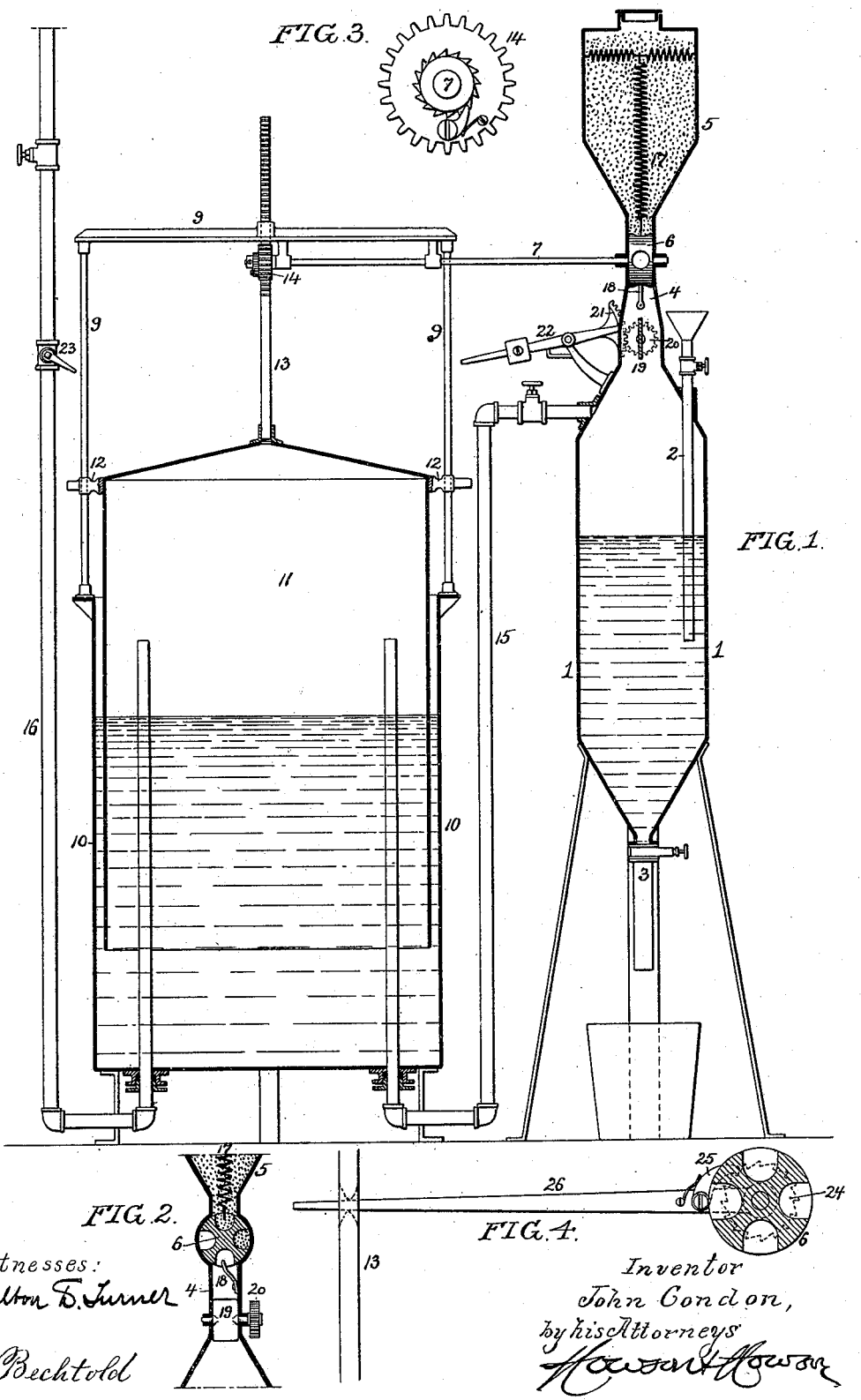

JOHN CONDON, OF PHILADELPHIA, PENNSYLVANIA.

ACETYLENE-GAS-GENERATING APPARATUS.

SPECIFICATION forming part of Letters Patent No. 617,563, dated January 10, 1899.

Application filed May 28, 1897. Serial No. 638,526. (No model.)

*To all whom it may concern:*

Be it known that I, JOHN CONDON, a citizen of the United States, residing in Philadelphia, Pennsylvania, have invented certain Improvements in Gas-Generating Apparatus, of which the following is a specification.

The objects of my invention are to so construct a gas-generating apparatus as to provide for generating the gas in limited quantity as required and to prevent the generation of gas in quantity exceeding a predetermined amount at any one time. These objects I attain in the manner hereinafter set forth, reference being had to the accompanying drawings, in which—

Figure 1 is a vertical sectional view of gas-generating apparatus constructed in accordance with my invention. Fig. 2 is a transverse section of part of the same. Fig. 3 is an enlarged view of part of the apparatus, and Fig. 4 is a view illustrating a modification.

The generator consists of a vessel 1, of suitable form and dimensions, partially filled with water, which may be introduced into the same through a suitably-valved filling-spout 2, the lower portion of the vessel having a valved branch 3, through which the contents of the vessel or any part of the same may be withdrawn as desired into a receptacle below said branch. The vessel 1 communicates through a neck 4 with a hopper or reservoir 5, provided with any suitable form of tight-fitting lid or cover, this reservoir being intended for holding powdered or granular carbid of calcium or other material, which upon contact with water will generate gas, the gas generated in the case of carbid of calcium being acetylene gas, which is available for illuminating purposes. The neck 4 is enlarged in the upper portion, so as to form a casing for a measuring-wheel 6, which fits therein so as to be free to turn, but so snugly as to prevent any leakage of the powdered or granular material past the same. The measuring-wheel is secured to a shaft 7, adapted to bearings in a framework 9, mounted upon a tank 10, which contains a gas-holder 11, having its lower portion immersed in water contained in said tank 10, the upper portion of said gas-holder having guides 12, which slide upon the upright members of the frame 9 as said gas-holder rises and falls.

Projecting from the gas-holder 11 is a stem 13, upon which is formed a rack engaging with a spur-wheel 14, loosely mounted on the shaft 7, but having ratchet-and-pawl connection therewith, as shown in Fig. 3, whereby as the gas-holder 11 rises the spur-wheel will turn without imparting movement to the shaft 7, but as said gas-holder descends the turning movement thereby imparted to the spur-wheel 14 will be transmitted to the shaft 7, so as to turn or partially turn the measuring-wheel 6. The latter wheel has pockets, as shown in Fig. 2, each of these pockets as it passes under the reservoir 5 receiving a supply of powdered or granular material from said reservoir, and this material as the measuring-wheel continues to turn being carried around until it is finally dropped from the pocket through the neck 4 into the water contained in the vessel 1, the gas thereby generated passing through a valved pipe 15 into the gas-holder 11, from which it can flow through the valved pipe 16 to supply burners or other gas-utilizing devices properly located.

In order to prevent clogging of the powdered or granular material in the reservoir 5, I mount therein a coiled wire 17 or equivalent agitator, the lower end of which projects into the uppermost pocket of the measuring-wheel 6 when the latter is brought into position beneath the reservoir, so that on the further movement of the wheel said lower end of the agitator will be struck and moved sidewise, thereby preventing such clogging of the material in the reservoir as would interfere with the proper filling of the pockets of the measuring-wheel as they are successively brought into position to be filled.

In order to insure the discharge of the material from the pockets of the measuring-wheel, I mount in the neck 4, below said wheel, a spring-finger 18, the free end of which springs into each pocket of the wheel as the latter is brought into the lowermost position, thereby loosening the contents of the pocket and insuring the discharge of the same downwardly through the neck 4.

In order to prevent the continuous evolution of gas in case of accident to the feeding device, which would permit material to flow from the receptacle 5 at a faster rate than is intended, I mount in the neck 4, below the measuring-wheel 5, a cut-off valve 19, which in the present instance consists of a simple butterfly-valve mounted upon a spindle having a spur-wheel 20, with which meshes a segmental rack 21 on one arm of a lever 22, hung to a bearing on some suitable fixed portion of the apparatus, the other arm of said lever projecting into range of one of the guides 12 of the gas-holder 11 or some other attachment to or portion of said holder, whereby when the latter reaches a certain height the valve 19 will be closed, so as to obstruct the flow of material through the neck 4 and thereby prevent any further generation of gas in the vessel 1. At the same time the other guide 12 of the gas-holder or some other available attachment to or portion of said holder acts upon the arm of a valve 23 in the service-pipe 16, so as to cut off the flow of gas through said pipe and thereby call the attention of the user of the apparatus to the fact that the feeding device is not operating properly and needs attention. After the defect has been remedied the gas is turned on again by simply moving the arm of the valve 23 by hand into position to open the valve again, the arm being moved outwardly, so as to clear the projection on the gas-holder.

The spent lime which accumulates in the lower portion of the vessel 1 may be readily removed therefrom at intervals by opening the valve in the branch 3.

Apparatus of the character above described provides for the generation of the gas in limited quantity, as required for immediate consumption, the storage of any large volume of gas being rendered unnecessary and the generation of gas in excess of a predetermined volume being effectually prevented.

Instead of operating the measuring-wheel by means of a shaft and pinion with ratchet connection, as above described, I may adopt other means for causing the movement of the gas-holder to impart intermittent movement to the measuring-wheel. For instance, in Fig. 4 I have shown a construction in which the shaft of said wheel has upon it a ratchet-wheel 24, operated by a pawl 25, hung to a lever 26, which engages with the stem 13 of the gas-holder and is moved thereby as the gas-holder rises and descends.

Having thus described my invention, I claim and desire to secure by Letters Patent—

1. The combination of the gas-generating vessel, a reservoir of powdered or granular material located above the same, a rotating feeder located between the reservoir and the generating vessel, and a stirrer or agitator acting upon the material in the reservoir and having a lower end adapted to project into the path of the rotating feeder so as to be vibrated thereby, substantially as specified.

2. The combination of the gas-generating vessel, a reservoir of powdered or granular material above the same, a pocketed measuring-wheel located in a neck between said reservoir and generating vessel, and a spring-finger adapted to enter the pockets of the measuring-wheel as the same are successively brought into position to discharge their contents, substantially as specified.

3. The combination of a gas-generating vessel, a reservoir of powdered or granular material above the same, a feeding device located between said receptacle and the gas-generator, a cut-off valve located below said feeding device, a movable gas-holder communicating with the gas-generating vessel, and provision whereby the movement of said gas-holder is caused to operate the feeding device and also to close the cut-off valve when a predetermined amount of gas has been generated, substantially as specified.

In testimony whereof I have signed my name to this specification in the presence of two subscribing witnesses.

JOHN CONDON.

Witnesses:
 WILL. A. BARR,
 JOS. H. KLEIN.